(12) United States Patent
Gilman et al.

(10) Patent No.: US 9,527,147 B2
(45) Date of Patent: Dec. 27, 2016

(54) SAW BLADE INDEXING ASSEMBLY

(71) Applicant: Simonds International Corporation, Fitchburg, MA (US)

(72) Inventors: David Gilman, Camas, WA (US); Jeremiah Gilbert, Portland, OR (US); Marc Elkins, Washougal, WA (US)

(73) Assignee: Simonds International LLC, Fitchburg, MA (US)

( * ) Notice: Subject to any disclaimer, the term of this patent is extended or adjusted under 35 U.S.C. 154(b) by 166 days.

(21) Appl. No.: 14/292,420

(22) Filed: May 30, 2014

(65) Prior Publication Data
US 2015/0343541 A1 Dec. 3, 2015

(51) Int. Cl.
*B23D 63/14* (2006.01)
*B23D 63/00* (2006.01)

(52) U.S. Cl.
CPC ......... *B23D 63/005* (2013.01); *B23D 63/008* (2013.01); *B23D 63/14* (2013.01)

(58) Field of Classification Search
CPC ........ B23D 63/00; B23D 63/14; B23D 63/008
USPC .................................. 451/45, 5, 8, 9, 10, 48
See application file for complete search history.

(56) References Cited

U.S. PATENT DOCUMENTS

| | | | |
|---|---|---|---|
| 4,018,107 A | | 4/1977 | Stier |
| 4,034,629 A | | 7/1977 | Von Arnauld et al. |
| 4,357,841 A | * | 11/1982 | Mote ............... B23D 63/14 76/41 |
| 4,418,589 A | | 12/1983 | Cowart, Sr. |
| 4,819,515 A | * | 4/1989 | Pfaltzgraff ........ B23D 63/005 451/17 |
| 5,078,029 A | | 1/1992 | Boggs et al. |
| 5,101,690 A | | 4/1992 | Emter |
| 5,836,808 A | | 11/1998 | Sawafuji et al. |
| 6,631,658 B2 | | 10/2003 | Brown |
| 7,452,263 B2 | | 11/2008 | Itoh et al. |

* cited by examiner

*Primary Examiner* — Robert Rose
(74) *Attorney, Agent, or Firm* — Duquette Law Group, LLC

(57) ABSTRACT

A circular saw blade indexing assembly includes a frame and a circular saw blade mounting assembly coupled to the frame. The circular saw blade mounting assembly includes a shaft configured to support a circular saw blade and that extends along a longitudinal axis defined by the circular saw blade mounting assembly. The circular saw blade indexing assembly includes an indexing mechanism rotatably coupled to the circular saw blade mounting assembly and having a feed finger disposed at a radial distance from the longitudinal axis. The indexing mechanism is configured to rotate about the longitudinal axis between a first arc position and a second arc position to rotate a saw blade between the first arc position and the second arc position.

18 Claims, 9 Drawing Sheets

SAW BLADE INDEXING ASSEMBLY

BACKGROUND

To extend the life of a circular saw blade, the sawmill industry utilizes sharpening or profiling machines for regrinding the top and face portions of the teeth of the blade. In order to grind each tooth of a circular saw blade, the saw mill industry utilizes a variety of mechanisms to hold and position the saw blade relative to a grinder so that the teeth can be ground one at a time. For example, conventional sharpening machines include an indexing mechanism having a feed finger that contacts each saw blade tooth and rotates each tooth toward the grinder or grinding wheel. The indexing mechanism is conventionally actuated by either a linear actuator or by a cam assembly. Once in position, the sharpening machine plunges the grinding wheel into a gullet between adjacent teeth of the saw blade to sharpen a cutting face of the tooth.

SUMMARY

Conventional indexing mechanisms suffer from a variety of deficiencies. For example, for a sharpening machine utilizing a linear actuator to index the saw blade, the fixed relationship of the feed finger and the grinder require that the saw blade be carefully indexed according to a given spacing of the teeth. However, for saw blades having irregularly spaced teeth, as the feed finger contacts the gullet of a tooth and rotates the tooth toward the grinding wheel, the feed finger of the indexing mechanism can slip along the profile of the face of the tooth, rather than remain in a substantially constant location. Because the feed finger does not remain in the same location relative to the face of each tooth, the speed at which the feed finger advances the saw blade relative to the grinder will not be consistent. These inconsistent velocities can lead to the indexing mechanism positioning each tooth in a relatively different location relative to the grinder, which can lead to overgrinding of each tooth. This issue can be compounded during a sharpening process, as the indexing mechanism typically rotates the saw blade between two and three times past the grinder to provide the saw blade with a particular level of sharpness.

In another example, for a sharpening machine utilizing a cam assembly to drive the indexing mechanism to advance the saw blade, the indexing mechanism is configured to follow the arc of the cam. However, in certain cases, the axis of rotation of the indexing mechanism can be offset from the center of rotation of the cam. In such a case, as the indexing mechanism follows the rotation of the cam, the associated feed finger contacts the face of a saw blade tooth and slides along the face profile, rather than remaining in a substantially constant location, as it advances the saw blade. As described above, this can lead to overgrinding of each tooth.

By contrast to conventional indexing mechanisms, embodiments of the present innovation relate to a circular saw blade indexing assembly configured to advance each tooth of a circular saw blade to substantially the same location relative to the grinding mechanism. In one arrangement, a circular saw blade indexing assembly includes a circular saw blade mounting assembly configured to support a circular saw blade and an indexing mechanism rotatably coupled to the circular saw blade mounting assembly. With such a configuration, the rotation of the indexing mechanism is relative to the center of a saw blade carried by the circular saw blade mounting assembly. In use, when a feed finger of the indexing mechanism contacts a tooth of a saw blade, as the indexing mechanism rotates the saw blade, the feed finger remains in substantially the same location relative to the tooth. Accordingly, the indexing mechanism advances each tooth of the saw blade at a substantially consistent velocity and positions each tooth in substantially the same location relative to the grinding mechanism to minimize overgrinding of the saw blade.

In one arrangement, a circular saw blade indexing assembly includes a circular saw blade mounting assembly having a shaft configured to support a circular saw blade and extending along a longitudinal axis defined by the circular saw blade mounting assembly. The circular saw blade indexing assembly includes an indexing mechanism rotatably coupled to the circular saw blade mounting assembly and having a feed finger disposed at a radial distance from the longitudinal axis. The indexing mechanism is configured to rotate about the longitudinal axis between a first arc position and a second arc position to rotate a saw blade between the first arc position and the second arc position.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to a circular saw blade indexing assembly configured to advance each tooth of a circular saw blade to substantially the same location relative to the grinding mechanism. In one arrangement, a circular saw blade indexing assembly includes a circular saw blade mounting assembly configured to support a circular saw blade and an indexing mechanism rotatably coupled to the circular saw blade mounting assembly. With such a configuration, the rotation of the indexing mechanism is relative to the center of a saw blade carried by the circular saw blade mounting assembly. In use, when a feed finger of the indexing mechanism contacts a tooth of a saw blade, as the indexing mechanism rotates the saw blade, the feed finger remains in substantially the same location relative to the tooth. Accordingly, the indexing mechanism advances each tooth of the saw blade at a substantially consistent velocity and positions each tooth in substantially the same location relative to the grinding mechanism to minimize overgrinding of the saw blade.

Figure 1:
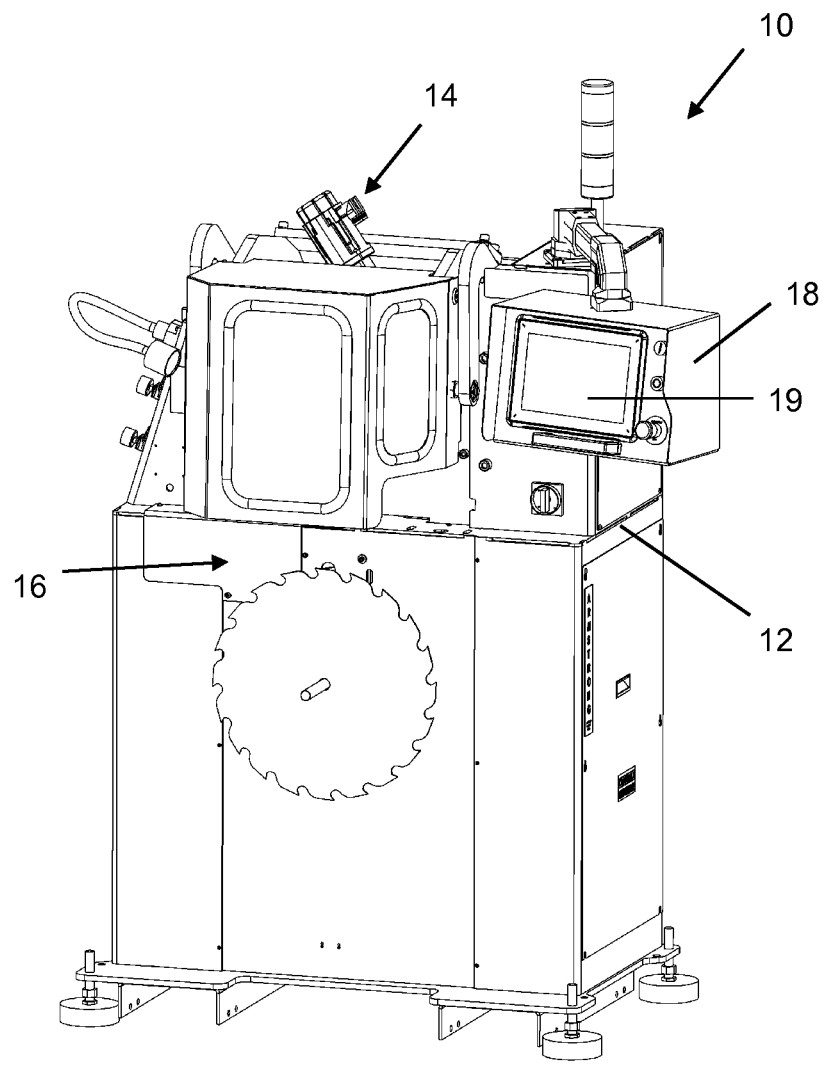
FIG. 1 illustrates a grinding system having a circular saw blade indexing assembly, according to one arrangement.

FIG. 1 illustrates a grinding system 10, according to one arrangement. The grinding system 10 includes a housing or frame 12 which carries a grinding apparatus 14 and a circular saw blade indexing assembly 16. The circular saw blade indexing assembly 16 is configured to advance each tooth of a circular saw blade toward the grinding apparatus 14. The grinding apparatus 14, such as motor driven wheel or disc made of a composite material, including diamond chips, is configured to grind a particular profile into each tooth of a circular saw blade. In one arrangement, the grinding system 10 includes a controller 18, such as a memory and processor, configured to control the feed rate of the circular saw blade indexing assembly 16 and the motion of the grinding apparatus 14 relative to each tooth to set a particular tooth profile geometry for each tooth of the circular saw blade.

In order to maintain consistent profiling of each tooth, the circular saw blade indexing assembly 16 is configured to advance each tooth of the circular saw blade to a substantially consistent location relative to the grinding apparatus 14. An arrangement of the circular saw blade indexing assembly 16 is described in detail below.

FIGS. 2A-2C and 3 illustrate front and rear perspective views of the circular saw blade indexing assembly 16, respectively. For clarity, the grinding apparatus 14 and other details of the grinding system 10 are not shown. With reference to both FIGS. 2A-2C and FIG. 3, the circular saw blade indexing assembly 16 includes a circular saw blade mounting assembly 20 and an indexing mechanism 21.

The circular saw blade mounting assembly 20 is configured to secure a circular saw blade to the grinding system 10. For example, with particular reference to FIG. 2A, the circular saw blade mounting assembly 20 includes a base 22 and an elongate shaft 24 mounted to the base 22. The base 22 is coupled to a frame 12, such as the frame of the grinding apparatus 14 and is configured to dispose the shaft 24, and a longitudinal axis 24 of the base 22, at a radial distance 25 from a feed finger 30 of the indexing mechanism 21. For example, the base 22 can be coupled to a set of rails 28 of the grinding system 10 via a set of rollers 26. As will be described in detail below, interaction between the rollers 26 and the set rails 28 allows a user to adjust the position of the shaft 24 relative to the indexing mechanism 21.

Figure 2A:
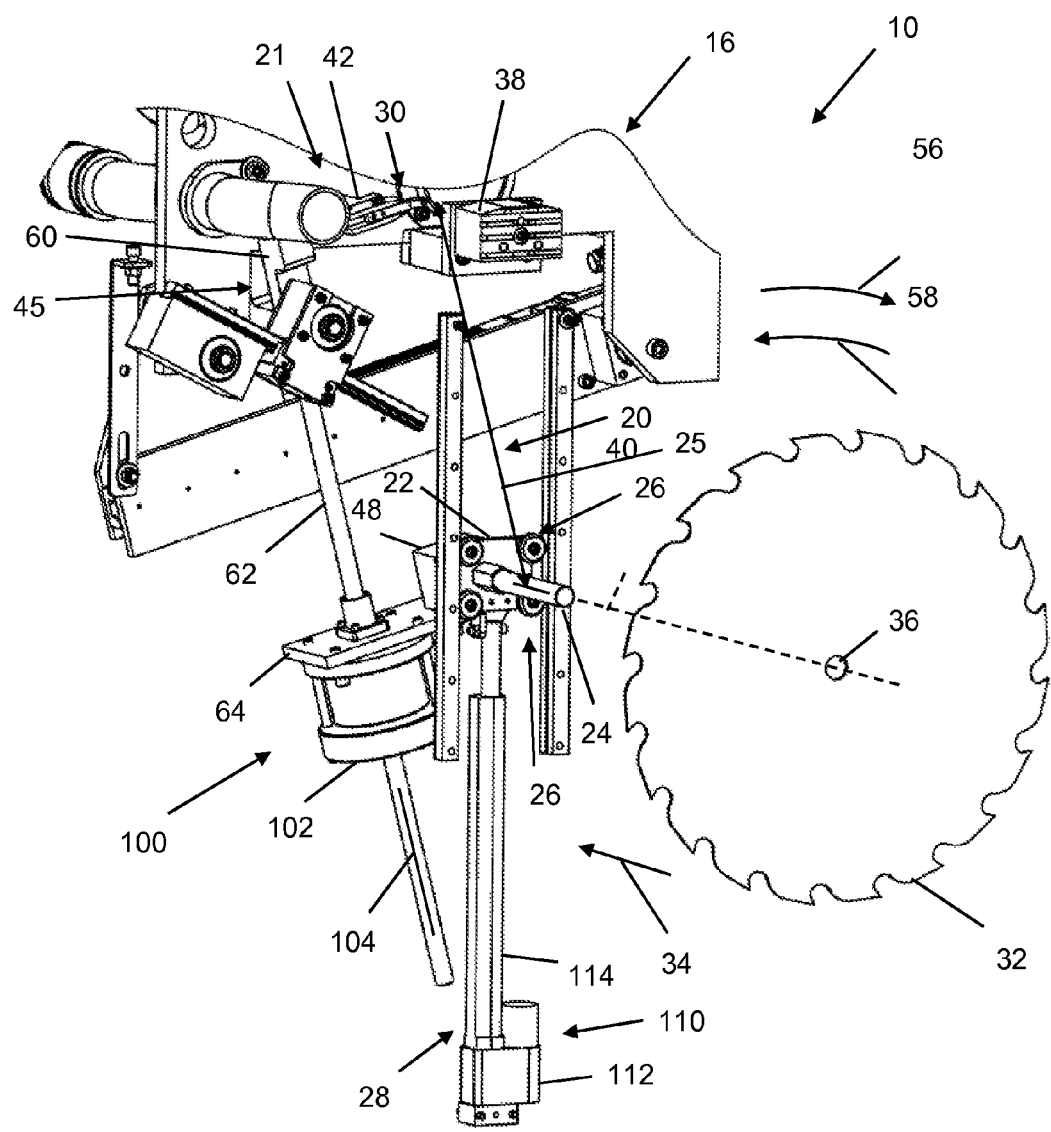
FIG. 2A illustrates a first front perspective view of the circular saw blade indexing assembly of FIG. 1, according to one arrangement.
Figure 2B:
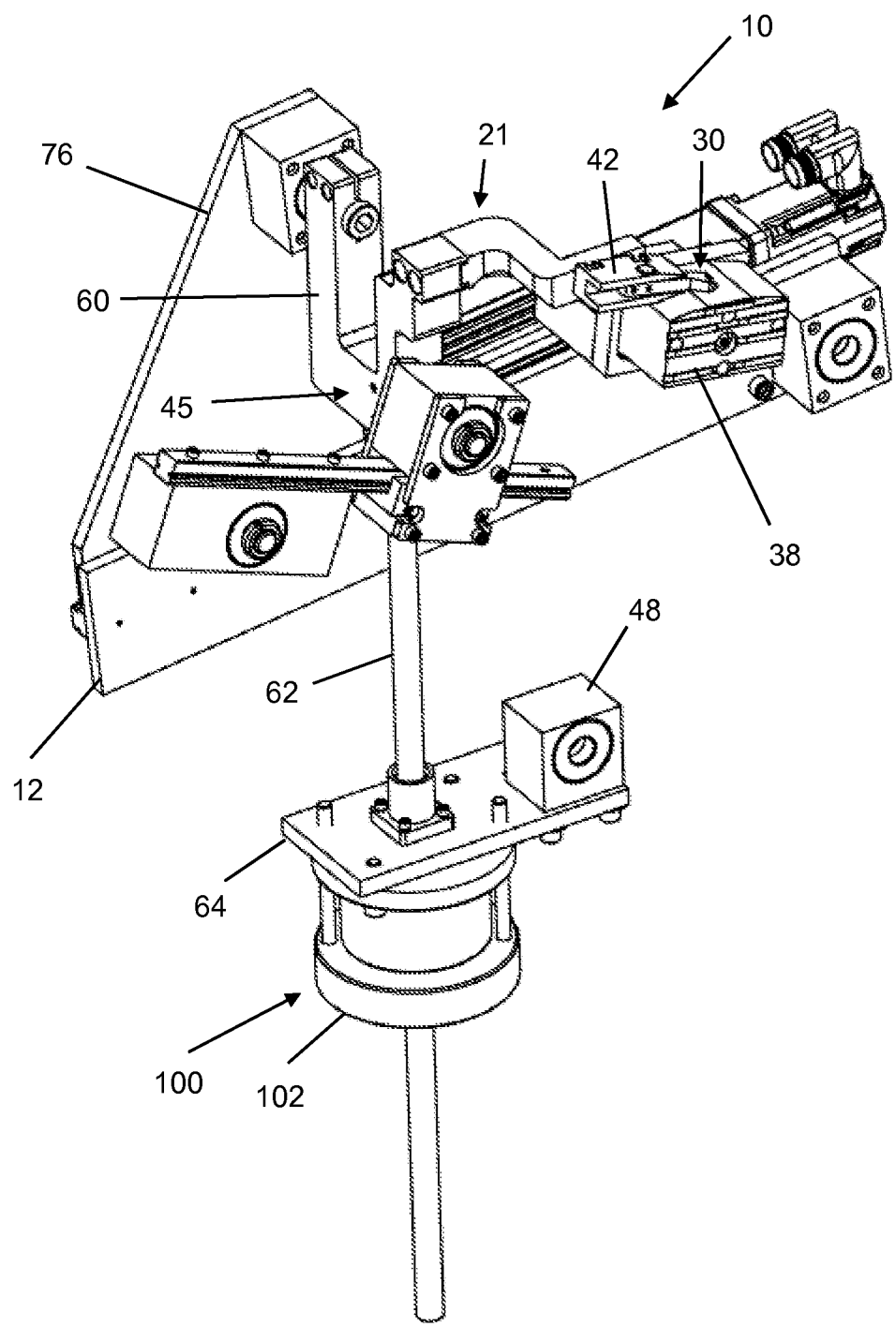
FIG. 2B illustrates a second front perspective view of the circular saw blade indexing assembly of FIG. 1, according to one arrangement.
Figure 2C:
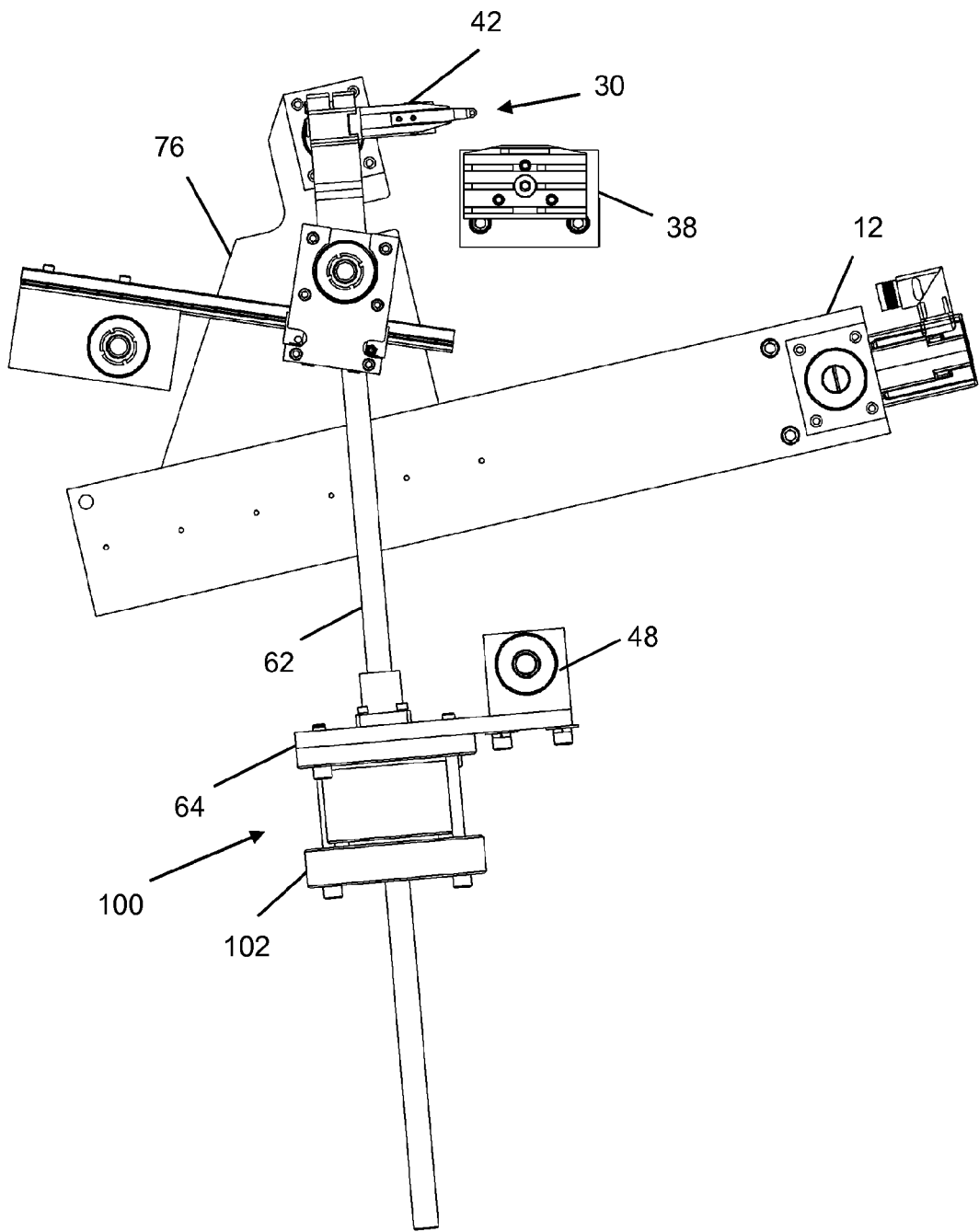
FIG. 2C illustrates a front view of the circular saw blade indexing assembly of FIG. 1, according to one arrangement.

The shaft 24 is configured to support a circular saw blade 32, as schematically indicated in phantom in FIG. 2A. For example, an operator can dispose the saw blade 32 onto the shaft 24 along direction 34 such that an opening 36 defined by the saw blade 32 extends about a circumference of the shaft 24 and a face of the saw blade 32 is disposed against baseplate 38. With such positioning, the center of the saw blade 32 is substantially collinear with a longitudinal axis 40 of the circular saw blade mounting assembly 20. Once in position, the operator can secure the saw blade 32 to the shaft 24 such that, in use, the shaft 24 and the saw blade 32 rotate relative to the base 22 and about the longitudinal axis 40 defined by the mounting assembly 20.

The indexing mechanism 21 is rotatably coupled to the circular saw blade mounting assembly 20 and is configured to rotate, and substantially track the rotational arc of, the circular saw blade 32 during operation. For example, with particular reference to FIG. 2A, the indexing mechanism 21 includes a housing 42 that carries the feed finger 30, a coupling mechanism 45, and an indexing mechanism bearing 48 rotatably coupled to the base 22 of the circular saw blade mounting assembly 20.

Figure 4A:
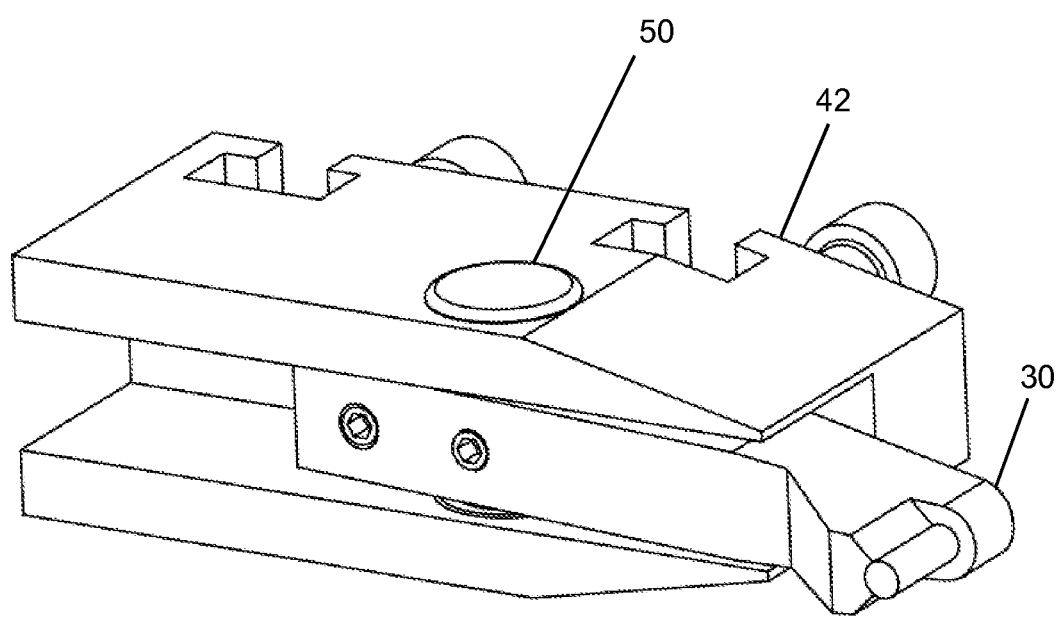
FIG. 4A illustrates a perspective view of an indexing mechanism of the circular saw blade indexing assembly of FIG. 1, according to one arrangement.
Figure 4B:
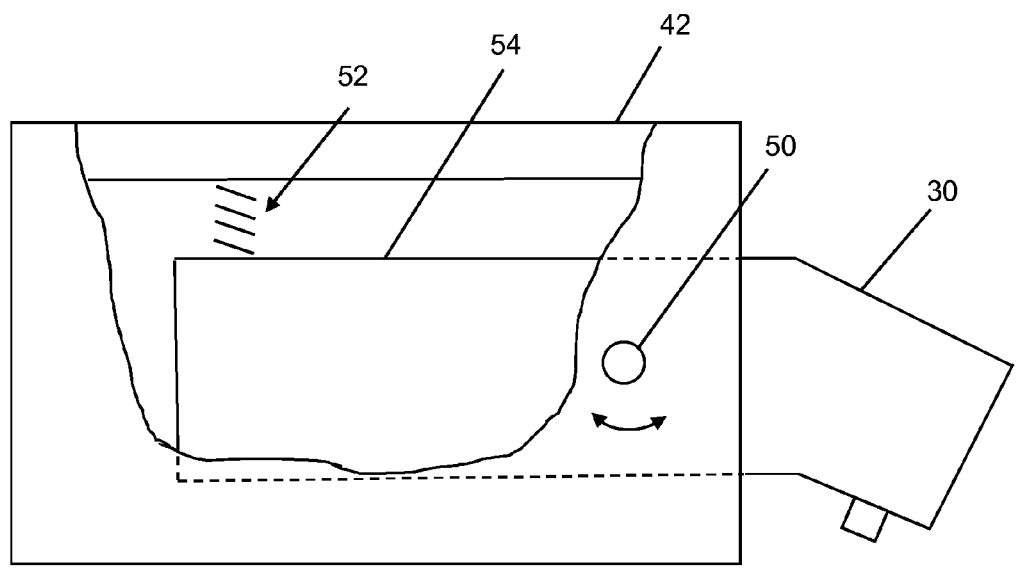
FIG. 4B illustrates a schematic top, partial cutaway view of a housing of the indexing mechanism of FIG. 4A, according to one arrangement.

The feed finger 30 is configured to contact a portion of each tooth of the circular saw blade 32 to advance each tooth toward the grinding apparatus 14 of the grinding system 10. For example, as will be described below, the feed finger 30 can contact a face portion of each tooth of the saw blade while rotating the saw blade 32. In such an arrangement, to limit the wear of the feed finger 30 over time, the feed finger 30 can be manufactured from a relatively high-strength, wear-resistant material, such as a carbide material. In one arrangement, the feed finger 30 is pivotably coupled to the housing 42. For example, with reference to FIGS. 4A and 4B, the housing 42 includes a pin 50 extending between opposing walls of the housing 42 and through a length of the feed finger 30. The housing 42 further includes a spring 52 coupled between a wall of the housing 42 and to a side 54 of the feed finger 30. The spring 52 is configured to bias the rotational position of the feed finger 30 toward a face of the circular saw blade 32 and allows the feed finger 30 to pivot within housing 42 when the feed finger 30 moves across the face of the saw blade 32.

For example, with additional reference to FIG. 2A, in the case where the indexing mechanism 21 is configured to rotate the feed finger 30 along a clockwise direction 56, the spring 52 biases the feed finger 30 about pin 50 and into contact with a tooth of the saw blade 32, such as into contact with the face portion of a tooth. In the case where the indexing mechanism 21 is configured to retract along a counter clockwise direction 58, the feed finger 30 contacts a face portion of the saw blade 32 which causes feed finger 30 to overcome the biasing force generated by the spring 52 and to pivot about the pin 50 and away from the tooth of the saw blade 32.

The coupling mechanism 45 disposes the feed finger 30 at a radial distance 25 from the longitudinal axis 40 of the circular saw blade mounting assembly 20. While the coupling mechanism 45 can be configured in a variety of ways, in one arrangement, the coupling mechanism 45 includes a bracket element 60 coupled to the housing 42, a support 62 coupled to the bracket element 60, and a support plate 64 coupled between the support 62 and the indexing mechanism bearing 48. The coupling mechanism 45 is configured to set the radial distance 25 such that the radial distance 25 substantially corresponds (e.g., is substantially equal) to a radius of the saw blade 32 supported by the shaft 24.

As indicated above, the coupling mechanism 45 secures the housing 42 of the indexing mechanism 21 to the indexing mechanism bearing 48. The indexing mechanism bearing 48 is rotatably coupled to the base 22 and is configured to rotate about the longitudinal axis 40 of the base 22. Accordingly, the coupling mechanism 45 and the indexing mechanism bearing 48 ties the rotation of the feed finger 30 to the longitudinal axis 40 of the base 22 and, as will be described below, to the rotational arc of a saw blade 32 mounted to the shaft 24.

Rotation of the indexing mechanism 21 can be controlled in a variety of ways. In one arrangement, with reference to FIG. 3, the circular saw blade mounting assembly 20 includes an actuator 70, such as a linear actuator element 71 and motor 73, having a first end 72 coupled to a frame 12 of the grinding system 10 and a second end 74 coupled to the indexing mechanism 21. For example, as illustrated, the second end 74 of the actuator 70 is coupled to a first end 75 of a support element 76, such as a plate, and a second end 77 of the support element 76 is mounted to the bracket 60. The support element 76 is slidably coupled to a rail 78 associated with the frame 12. In use, as the motor 72 of the actuator 70 translates the linear actuator element 71 along path 80, the linear actuator element 71 causes the support element 76 to translate along the rail 78 relative to the frame 12. Translation of the support element 76 causes the indexing mechanism 21 to rotate within an arc (i.e., between first and second arc positions) about the longitudinal axis 40 of the base 22.

Figure 5:
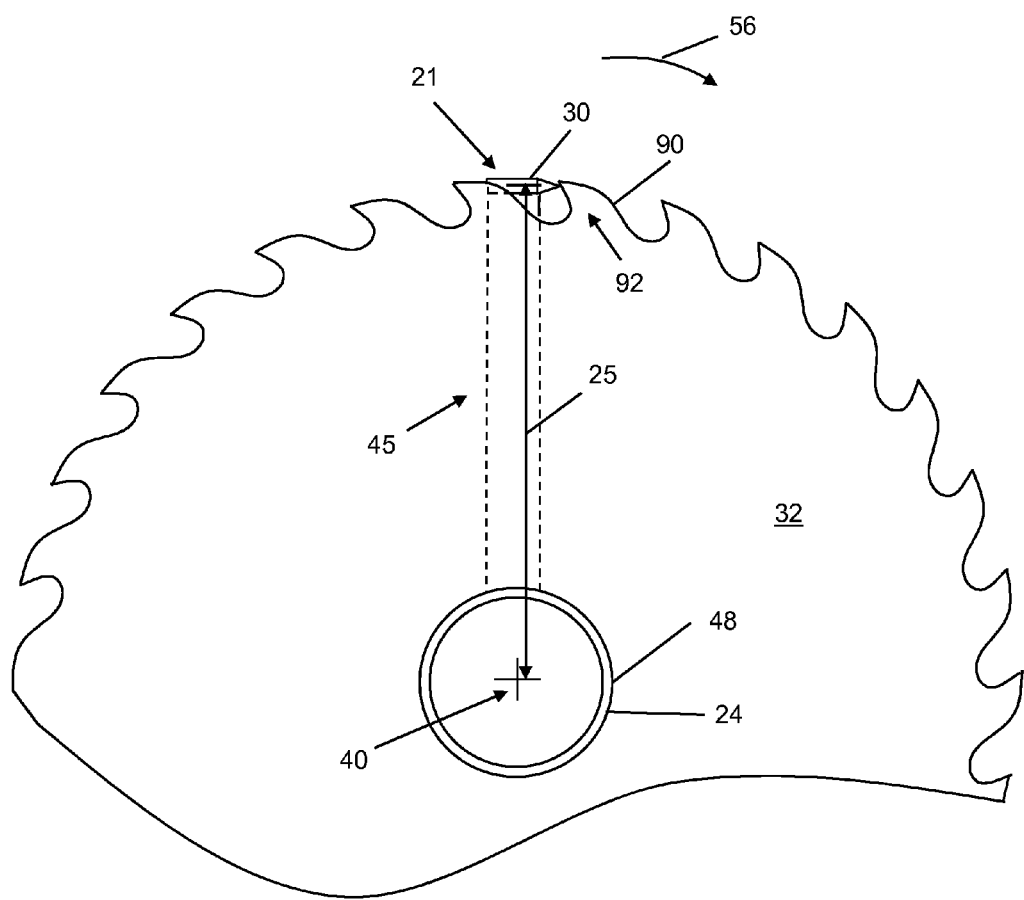
FIG. 5 illustrates a schematic representation of the positioning of a feed finger of the circular saw blade indexing mechanism relative to a saw blade in a first arc position, according to one arrangement.
Figure 6:
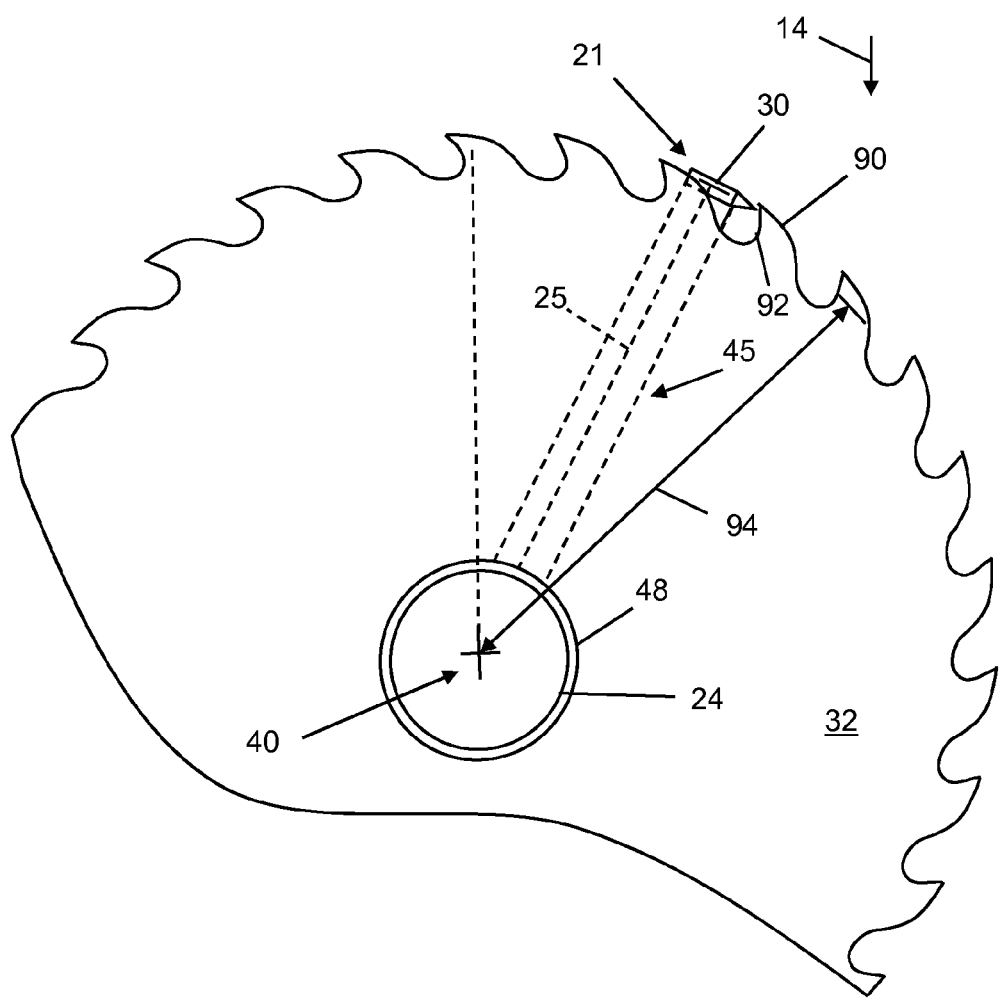
FIG. 6 illustrates a illustrates a schematic representation of the positioning of a feed finger of the circular saw blade indexing mechanism relative to a saw blade in a second arc position, according to one arrangement.

As indicated above, the circular saw blade indexing assembly 16 is configured to advance each tooth of the circular saw blade 36 to a substantially consistent location relative to a grinding apparatus 14 in order to maintain consistent tooth-to-tooth profiling. Operation of the circular saw blade indexing assembly 16 is illustrated in FIGS. 1, 5, and 6.

In use, an operator places and secures a circular saw blade 32 onto the shaft 24 of the circular saw blade mounting assembly 20 and positions the saw blade 32 such that the center of the shaft 24 is disposed at a radial distance 25 from the feed finger 30. As indicated in FIG. 5, the feed finger 30 then contacts a tooth 90 at location 92, such as a location within a tooth face. As the actuator 70 rotates the indexing mechanism 21 along direction 56, the indexing mechanism bearing 48 rotates about the longitudinal axis 40 of the base 22 to dispose the feed finger 30 and tooth 90 from a first arc position, shown in FIG. 5, to a second arc position, shown in FIG. 6. Because the radial position of the feed finger 30 is substantially equal to the radius of the saw blade 32, the feed finger 30 remains in substantially the same location on the tooth 90 during this rotation. By substantially maintaining the positioning of the feed finger 30 on the tooth 90 at location 92 during rotation, the indexing mechanism 21 rotates each tooth of the saw blade 32 at a substantially constant, relative velocity toward a grinding apparatus 14. This allows the grinding apparatus 14 to create a consistent sharpened profile from tooth to tooth and minimizes over-grinding of the saw blade 32.

As indicated above, the radial distance 25 between the feed finger 30 of the indexing mechanism 21 and the longitudinal axis 40 corresponds to a radius 94 of a saw blade 32 supported by the shaft 24. However, circular saw blades 32 are typically manufactured having a variety of radii. In order to accommodate saw blades 32 having a variety of radii, in one arrangement as illustrated in FIGS. 2A-2C and 3, the circular saw blade indexing assembly 16 includes a radius adjustment mechanism 100. For example, with reference to FIGS. 2A-2C, the radius adjustment mechanism 100 is coupled between the indexing mechanism 21 and the circular saw blade mounting assembly 20. The radius adjustment mechanism 100 is configured to adjust the radial position 25 of the shaft 24 of the circular saw blade mounting assembly 20 relative to the feed finger 30 of the indexing mechanism 21 to dispose the teeth of the saw blade 32 in proximity to the feed finger 30 and to maintain the center of the saw blade 32 at a substantially set distance relative to the feed finger 30.

The radius adjustment mechanism 100 can be configured in a variety of ways. In one arrangement, the radius adjustment mechanism 100 includes the support 62 of the coupling mechanism 45 and a collar 102 selectively coupled to the support 62 and secured to the circular saw blade mounting assembly 20. For example, with reference to FIGS. 2A-2C, the collar 102 is selectively coupled to the support 62 via a mechanical or magnetic lock and is secured to the indexing mechanism bearing 48 via plate 64. When decoupled from the support 62, the collar 102 is configured to translate along a longitudinal axis 104 of the support 62 to position the base 22 and shaft 24, and the saw blade 32, relative to the feed finger 30 of the indexing mechanism 21. When the operator has positioned the teeth of the saw blade 32 in proximity to the feed finger 30, the operator couples the collar 102 to the support 62, such as by using the lock mechanism. As indicated in FIGS. 2A-2C and 3, because the support 62 forms part of the actuating mechanism 21, during operation the radius adjustment mechanism 100 rotates relative to the base 22 along first and second arc directions.

The positioning of the radius adjustment mechanism 100 can be controlled in a variety of ways. In one arrangement, the radius adjustment mechanism 100 includes a positioning actuator 110 configured to control the positioning of the shaft 24 relative to the feed finger 30. For example, the positioning actuator 110 includes a housing 112 which can be secured to the frame 12 of the grinding system 10, and an arm 114, such as a motor driven arm, coupled to the collar 102 via plate 64.

When adjusting the radial distance 25 between the feed finger 30 and the shaft 24 to set radius of the saw blade 32 relative to feed finger 30, an operator first drives the actuator 70 to position the feed finger housing 42 to a docking position to minimize motion of the feed finger 30. Next, the operator disengages the collar 102 from the support 63 which allows collar 102 to translate along longitudinal axis 104 of the support 62. Next, the operator activates the positioning actuator 110 coupled to saw blade mounting assembly 20 to adjust radial distance 25 between the center position of a saw blade carried by the shaft 24 and the feed finger 30. As the actuator 110 translates the saw blade mounting assembly 20, the rollers 26 of the base 22 rotate relative to the rails 28 and the collar 102 translates relative to the support 62. Such translation allows the operator to adjust the position of the shaft 24 relative to the indexing mechanism 21 until the teeth of the saw blade 32 is disposed in proximity to the feed finger 30 (e.g., such that a tip of the feed finger 30 is disposed within a face location defined by a saw blade tooth). Once in this position, the operator can secure the collar 102 to the support 62, such as by using a locking mechanism, and can drive the actuator 70 to dedock the feed finger housing 42 from the docking position.

During use, as a manufacturer sharpens a saw blade 32 multiple times, the diameter of the saw blade 32 can shrink. For example, a circular saw blade having a 24 inch diameter with a two inch tooth spacing can shrink to a 22 inch diameter having a 1.95 inch tooth spacing after multiple sharpening procedures. However, in conventional grinding systems, as the saw diameter shrink, the grinder can continue to profile each of the teeth on a circular saw blade based upon the original 24 inch diameter of the saw blade and two inch tooth spacing.

Figure 3:
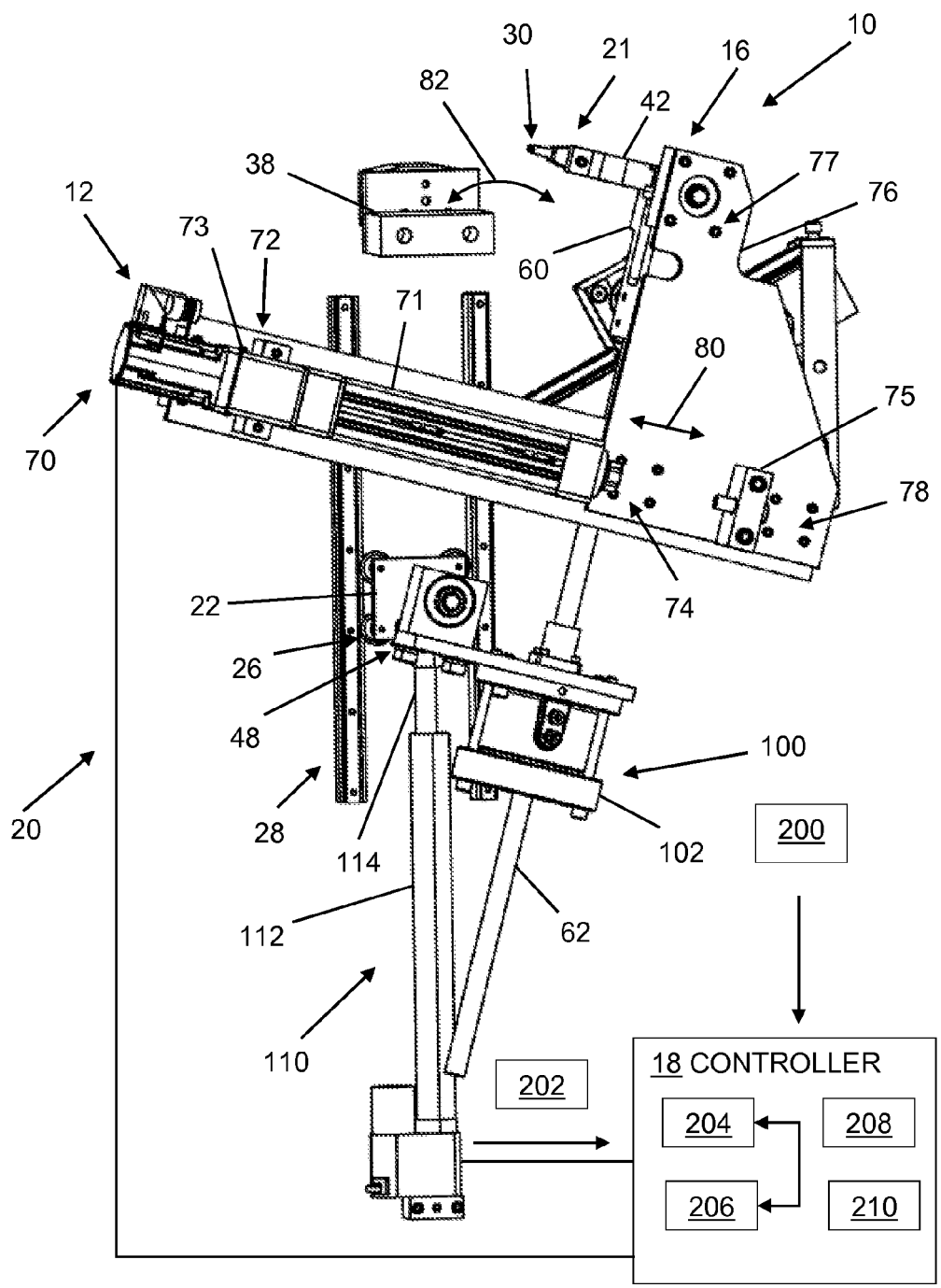
FIG. 3 illustrates a rear perspective view of the circular saw blade indexing assembly of FIG. 1, according to one arrangement.

In one arrangement, the grinding system 10 is configured to track the change in size for a given saw blade 32 and to adjust the grinding process according to the change in saw blade size. For example, as illustrated in FIG. 3, the grinding system 10 includes the controller 18, such as a processor and a memory, disposed in electrical communication with the circular saw blade mounting assembly 20 and with the indexing mechanism 21.

During operation, the controller 18 is configured to receive a blade diameter value 200 associated with a circular saw blade 32 supported by the circular saw blade mounting assembly 20 where the value 200 is equal to the initial diameter of the saw blade 32. For example, with reference to FIG. 1, an operator can enter the diameter of the circular saw blade 32 on a keypad or touchpad 19 associated with the controller 18.

Returning to FIG. 3, the controller 18 is configured to detect an actual diameter of the circular saw blade 32 from the circular saw blade mounting assembly 20. For example as the operator adjusts the position of the shaft 24 relative to the feed finger 30 using the positioning actuator 110, the positioning actuator 110 provides a positioning signal 202 to the controller 18 which indicates the radial distance 25 between the center of the saw blade 32 (i.e., the longitudinal axis 40 of the assembly 20) and the feed finger 30. The controller 18 is then configured to apply a calibration factor to the positioning signal 202 to determine the actual diameter value 204 of the saw blade 32.

The controller 18 is then configured to compare the actual blade diameter value 204 with a blade diameter threshold value 206. For example, the controller 18 can be preconfigured with a set of blade diameter threshold values and can select a particular blade diameter threshold value 206 from the set based upon the blade diameter value 200 received by the controller 18. For example, in the case where the controller 18 receives a blade diameter value 200 indicating the saw blade 32 is a 24 inch diameter blade, the controller 18 can select the blade diameter threshold value 206 that corresponds to the 24 inch diameter of the saw bade 32.

In the comparison, when the controller 18 detects that the actual blade diameter value 204 exceeds the blade diameter threshold value 206, the controller 18 maintains a set of grinding criteria 208 applied to the circular saw blade 32 based upon the received blade diameter value 200 of the circular saw blade. For example, assume the case where the actual blade diameter value 204 is 23.7 inches and the blade diameter threshold value 206 is 23.5 inches. In this case, because the actual blade diameter value 204 is greater than the blade diameter threshold value 206, the controller 18 is configured to maintain certain grinding criteria 208, such as the indexing speed of the actuator 70 associated with the indexing mechanism 21, the rotational and actuation speed associated with the grinding apparatus 14, and the tooth profile geometry generated by the grinding apparatus 14. However in the case when the actual blade diameter value 204 falls below the blade diameter threshold value 206, the controller 18 is configured to adjust the set of grinding criteria 210 based upon the actual blade diameter value 204 of the circular saw blade 32. For example, assume the case where the actual blade diameter value 204 is 23.2 inches and the blade diameter threshold value 206 is 23.5 inches. In this case, because the actual blade diameter value 204 is less than the blade diameter threshold value 206, the controller 18 is configured to adjust the set of grinding criteria 210, such as the indexing speed of the actuator 70 associated with the indexing mechanism 21, the rotational and actuation speed associated with the grinding apparatus 14, and the tooth profile geometry generated by the grinding apparatus 14, to correspond to a smaller diameter saw blade. This allows the grinding system 10 to minimize overgrinding of the saw blade 32 as its diameter decreases over time to provide accurate grinding and sharpening of the saw blade 32.

While various embodiments of the innovation have been particularly shown and described, it will be understood by those skilled in the art that various changes in form and details may be made therein without departing from the spirit and scope of the innovation as defined by the appended claims.

What is claimed is:

1. A circular saw blade indexing assembly, comprising:
   a circular saw blade mounting assembly having a shaft configured to support a circular saw blade and extending along a longitudinal axis defined by the circular saw blade mounting assembly;
   an indexing mechanism rotatably coupled to the circular saw blade mounting assembly and having a feed finger disposed at a radial distance from the longitudinal axis, the indexing mechanism configured to rotate about the longitudinal axis between a first arc position and a second arc position to rotate a saw blade between the first arc position and the second arc position; and
   a controller disposed in electrical communication with the circular saw blade mounting assembly, the controller configured to:
   receive a preset blade diameter value associated with a circular saw blade supported by the circular saw blade mounting assembly;
   detect an actual diameter value of the circular saw blade from the circular saw blade mounting assembly;
   compare the actual blade diameter value with a blade diameter threshold value;
   when the actual blade diameter value exceeds the blade diameter threshold value, maintain a set of grinding criteria applied to the circular saw blade based upon the received blade diameter value of the circular saw blade; and
   when the actual blade diameter value falls below the blade threshold value, adjust the set of grinding criteria applied to the circular saw blade based upon the actual blade diameter value of the circular saw blade.

2. The circular saw blade indexing assembly of claim 1, wherein:
   the circular saw blade mounting assembly comprises a base coupled to the frame and configured to carry the shaft; and
   the indexing mechanism comprises an indexing mechanism bearing rotatably coupled to the base and configured to rotate about the longitudinal axis of the circular saw blade mounting assembly.

3. The circular saw blade indexing assembly of claim 1, further comprising an actuator configured to rotate the indexing mechanism about the longitudinal axis between the first arc position and the second arc position, the actuator having a first end coupled to the frame and a second end coupled to the indexing mechanism.

4. The circular saw blade indexing assembly of claim 1, wherein the radial distance between the feed finger of the indexing mechanism and the longitudinal axis of the shaft substantially corresponds to a radius of a saw blade supported by the shaft.

5. The circular saw blade indexing assembly of claim 4, further comprising a radius adjustment mechanism coupled between the indexing mechanism and the circular saw blade mounting assembly, the radius adjustment mechanism configured to dispose the shaft of the circular saw blade mounting assembly between a first position and a second position relative to the feed finger of the indexing mechanism.

6. The circular saw blade indexing assembly of claim 5, wherein the radius adjustment mechanism comprises:

a support coupled to the indexing mechanism; and a collar coupled to the circular saw blade mounting assembly and selectively coupled to the support, the collar configured to translate along a longitudinal axis of the support to position the circular saw blade mounting assembly between the first position and the second position relative to the feed finger of the indexing mechanism.

7. The circular saw blade indexing assembly of claim 6, comprising a positioning actuator coupled to the collar, the positioning actuator configured to translate the collar along a longitudinal axis of the support.

8. The circular saw blade indexing assembly of claim 1, wherein when detecting the actual diameter value of the circular saw blade from the circular saw blade mounting assembly, the controller is configured to receive a positioning signal from a positioning actuator associated with the circular saw blade mounting assembly.

9. The circular saw blade indexing assembly of claim 1, wherein when adjusting the set of grinding criteria based upon the actual blade diameter value of the circular saw blade, the controller is configured to adjust at least one of a speed of an actuator associated with the indexing mechanism, a speed associated with a grinding apparatus, and a tooth profile geometry generated by the grinding apparatus.

10. A grinding system, comprising:
a frame;
a grinding apparatus coupled to the frame
a circular saw blade mounting assembly coupled to the frame, a circular saw blade mounting assembly having a shaft configured to support a circular saw blade and extending along a longitudinal axis defined by the circular saw blade mounting assembly;
an indexing mechanism rotatably coupled to the circular saw blade mounting assembly and having a feed finger disposed at a radial distance from the longitudinal axis, the indexing mechanism configured to rotate about the longitudinal axis between a first arc position and a second arc position to rotate a saw blade between the first arc position and the second arc position relative to the grinding apparatus; and
a controller disposed in electrical communication with the circular saw blade mounting assembly, the controller configured to:
receive a preset blade diameter value associated with a circular saw blade supported by the circular saw blade mounting assembly;
detect an actual diameter value of the circular saw blade from the circular saw blade mounting assembly;
compare the actual blade diameter value with a blade diameter threshold value;
when the actual blade diameter value exceeds the blade diameter threshold value, maintain a set of grinding criteria applied to the circular saw blade based upon the received blade diameter value of the circular saw blade; and when the actual blade diameter value falls below the blade diameter threshold value, adjust the set of grinding criteria applied to the circular saw blade based upon the actual blade diameter value of the circular saw blade.

11. The grinding system of claim 10, wherein:
the circular saw blade mounting assembly comprises a base coupled to the frame and configured to carry the shaft; and
the indexing mechanism comprises an indexing mechanism bearing rotatably coupled to the base and configured to rotate about the longitudinal axis of the circular saw blade mounting assembly.

12. The grinding system of claim 10, further comprising an actuator configured to rotate the indexing mechanism about the longitudinal axis between the first arc position and the second arc position, the actuator having a first end coupled to the frame and a second end coupled to the indexing mechanism.

13. grinding system of claim 10, wherein the radial distance between the feed finger of the indexing mechanism and the longitudinal axis of the shaft substantially corresponds to a radius of a saw blade supported by the shaft.

14. The grinding system of claim 13, further comprising a radius adjustment mechanism coupled between the indexing mechanism and the circular saw blade mounting assembly, the radius adjustment mechanism configured to dispose the shaft of the circular saw blade mounting assembly between a first position and a second position relative to the feed finger of the indexing mechanism.

15. The grinding system of claim 14, wherein the radius adjustment mechanism comprises:
a support coupled to the indexing mechanism; and
a collar coupled to the circular saw blade mounting assembly and selectively coupled to the support, the collar configured to translate along a longitudinal axis of the support to position the circular saw blade mounting assembly between the first position and the second position relative to the feed finger of the indexing mechanism.

16. The grinding system of claim 15, comprising a positioning actuator coupled to the collar, the positioning actuator configured to translate the collar along a longitudinal axis of the support.

17. The grinding system of claim 10, wherein when detecting the actual diameter value of the circular saw blade from the circular saw blade mounting assembly, the controller is configured to receive a positioning signal from a positioning actuator associated with the circular saw blade mounting assembly.

18. The grinding system of claim 10, wherein when adjusting the set of grinding criteria based upon the actual blade diameter value of the circular saw blade, the controller is configured to adjust at least one of a speed of an actuator associated with the indexing mechanism, a speed associated with the grinding apparatus, and a tooth profile geometry generated by the grinding apparatus.

* * * * *